United States Patent
Yamamoto et al.

(10) Patent No.: US 9,102,024 B2
(45) Date of Patent: Aug. 11, 2015

(54) CLEARANCE INCREASING JIG OF HEAT TRANSFER TUBE AND ADDITIONAL INSTALLATION METHOD OF VIBRATION SUPPRESSION MEMBER

(71) Applicant: MITSUBISHI HEAVY INDUSTRIES, LTD., Tokyo (JP)

(72) Inventors: Takeshi Yamamoto, Tokyo (JP);
Kenichi Kawanishi, Tokyo (JP);
Masahito Matsubara, Tokyo (JP);
Yoshihisa Fujiwara, Tokyo (JP);
Tomochika Hamamoto, Tokyo (JP);
Yukihide Shimazu, Kobe (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 260 days.

(21) Appl. No.: 13/768,526

(22) Filed: Feb. 15, 2013

(65) Prior Publication Data
US 2014/0020233 A1    Jan. 23, 2014

(30) Foreign Application Priority Data

Jul. 20, 2012    (JP) ................................ 2012-162094

(51) Int. Cl.
*B23P 15/26*    (2006.01)
*B23Q 3/00*    (2006.01)
*F28F 9/013*    (2006.01)
*F28D 7/06*    (2006.01)

(52) U.S. Cl.
CPC ............... *B23Q 3/00* (2013.01); *F28F 9/0132* (2013.01); *F28D 7/06* (2013.01); *F28F 2265/30* (2013.01); *Y10T 29/49998* (2015.01)

(58) Field of Classification Search
USPC ........... 29/890.03, 890.031, 890.051; 165/69, 165/162, 172
See application file for complete search history.

(56) References Cited

U.S. PATENT DOCUMENTS

| | | | |
|---|---|---|---|
| 4,640,342 A | 2/1987 | Appleman | |
| 4,653,576 A | 3/1987 | Lagally | |
| 4,789,028 A * | 12/1988 | Gowda et al. | 165/162 |
| 2012/0145370 A1* | 6/2012 | Wanni et al. | 165/172 |

FOREIGN PATENT DOCUMENTS

| | | |
|---|---|---|
| EP | 0646760 A1 | 4/1995 |
| GB | 1532100 A | 11/1978 |
| GB | 2224820 A | 5/1990 |
| JP | 61-59196 A | 3/1986 |
| JP | 61-291896 A | 12/1986 |
| JP | 3-35565 B2 | 5/1991 |
| JP | 6-31712 B2 | 4/1994 |
| JP | 6-84802 B2 | 10/1994 |

OTHER PUBLICATIONS

EESR dated Sep. 24, 2014, issued in corresponding European Application No. 13155335.6; (8 pages).

* cited by examiner

*Primary Examiner* — Richard Chang
(74) *Attorney, Agent, or Firm* — Westerman, Hattori, Daniels & Adrian, LLP

(57) ABSTRACT

A clearance increasing jig of a heat transfer tube, includes: a jig main body inserted into a clearance between adjacent heat transfer tubes; an inflow hole provided in the jig main body and configured to allow a fluid to flow into the jig main body; and an increasing unit provided in the jig main body and configured to increase the clearance as the fluid flows into the jig main body.

10 Claims, 14 Drawing Sheets

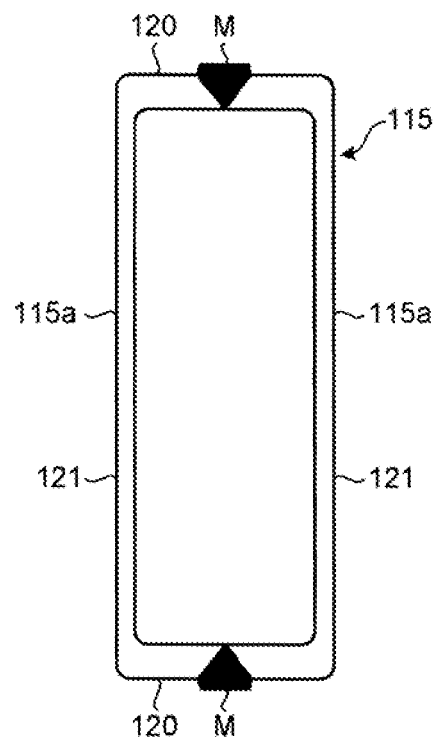
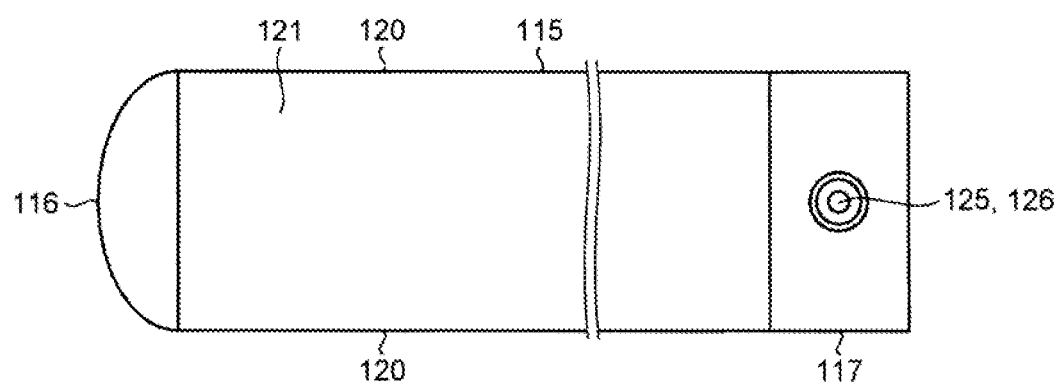

CLEARANCE INCREASING JIG OF HEAT TRANSFER TUBE AND ADDITIONAL INSTALLATION METHOD OF VIBRATION SUPPRESSION MEMBER

CROSS-REFERENCE TO RELATED APPLICATIONS

This application is based upon and claims the benefit of priority from Japanese Patent Application No. 2012-162094 filed Jul. 20, 2012, the entire contents of which are incorporated herein by reference.

BACKGROUND OF THE INVENTION

1. Field of the Invention

The present invention relates to a clearance increasing jig of a heat transfer tube that increases a clearance between adjacent heat transfer tubes and an additional installation method of a vibration suppression member using the clearance increasing jig.

2. Description of the Related Art

In the related art, a steam generator having a plurality of heat transfer tubes provided therein was known (see, for example, Patent Literature 1). Each of the heat transfer tubes provided in the steam generator has a U shape and a fluid such as a coolant is circulated in the heat transfer tube. When the fluid is circulated in the heat transfer tube, vibration (fluid excitation vibration) by the circulation of the fluid is generated in a circular arc portion of the U-shaped heat transfer tube. As a result, an anti-vibration bar as an anti-vibration member is inserted into a clearance of the heat transfer tube, serving as the circular arc portion, in the steam generator.

Herein, the anti-vibration bar disclosed in Japanese Patent Application Laid-open No. 61-291896 increases clearances of the plurality of heat transfer tubes. That is, the anti-vibration bar is inserted into the clearance of the heat transfer tubes and thereafter, is brought into contact with the heat transfer tubes by increasing the width of the anti-vibration bar to be slightly wider than the clearance of the heat transfer tubes.

Meanwhile, as the vibration suppression member to be additionally installed, a bar-shaped member may be used. In this case, in order to contact the vibration suppression member with the heat transfer tube, a vibration suppression member having substantially the same thickness as the clearance of the heat transfer tubes may be inserted. However, respective clearances of the heat transfer tubes are not particularly constant due to a size tolerance caused by a variation in flatness level of the heat transfer tube at the circular arc portion. Herein, the flatness level of the heat transfer tube represents a difference between a maximum outer diameter and a minimum outer diameter on one end surface which is orthogonal to a longitudinal direction of the heat transfer tube. As a result, there is a case in which the clearance of the heat transfer tubes is narrower than the thickness of vibration suppression member and in this case, it is difficult to insert the vibration suppression member into the clearance of the heat transfer tubes.

SUMMARY OF THE INVENTION

According to a first aspect of the present invention, there is provided a clearance increasing jig of a heat transfer tube, including: a jig main body inserted into a clearance between adjacent heat transfer tubes; an inflow hole provided in the jig main body and configured to allow a fluid to flow into the jig main body; and an increasing unit provided in the jig main body and configured to increase the clearance as the fluid flows into the jig main body.

According to a second aspect of the present invention, there is provided an additional installation method of a vibration suppression member that additionally installs the vibration suppression member at a clearance of adjacent heat transfer tubes by using the clearance increasing jig according to the first aspect, the method including: inserting the clearance increasing jig into the clearance of the adjacent heat transfer tubes; increasing the clearance by using the clearance increasing jig; inserting the vibration suppression member into the increased clearance; cancelling the increasing of the clearance by using the clearance increasing jig; and drawing the clearance increasing jig from the clearance.

BRIEF DESCRIPTION OF THE DRAWINGS

FIG. 19 is a cross-sectional view of the clearance increasing jig according to the third embodiment;

FIG. 20 is a plan view of a clearance increasing jig according to Modified Example 1;

DETAILED DESCRIPTION OF THE PREFERRED EMBODIMENTS

Hereinafter, embodiments of the present invention will be described in detail with reference to the accompanying drawings. Further, the present invention is not limited by the embodiments. Further, components which can be easily substituted by those skilled in the art or are substantially the same are included in components in the embodiments described below.

An object of the embodiments is to provide a clearance increasing jig of a heat transfer tube used to appropriately insert a vibration suppression member in a clearance of adjacent heat transfer tubes, and an additional installation method of the vibration suppression member using the clearance increasing jig.

First Embodiment

Figure 1:
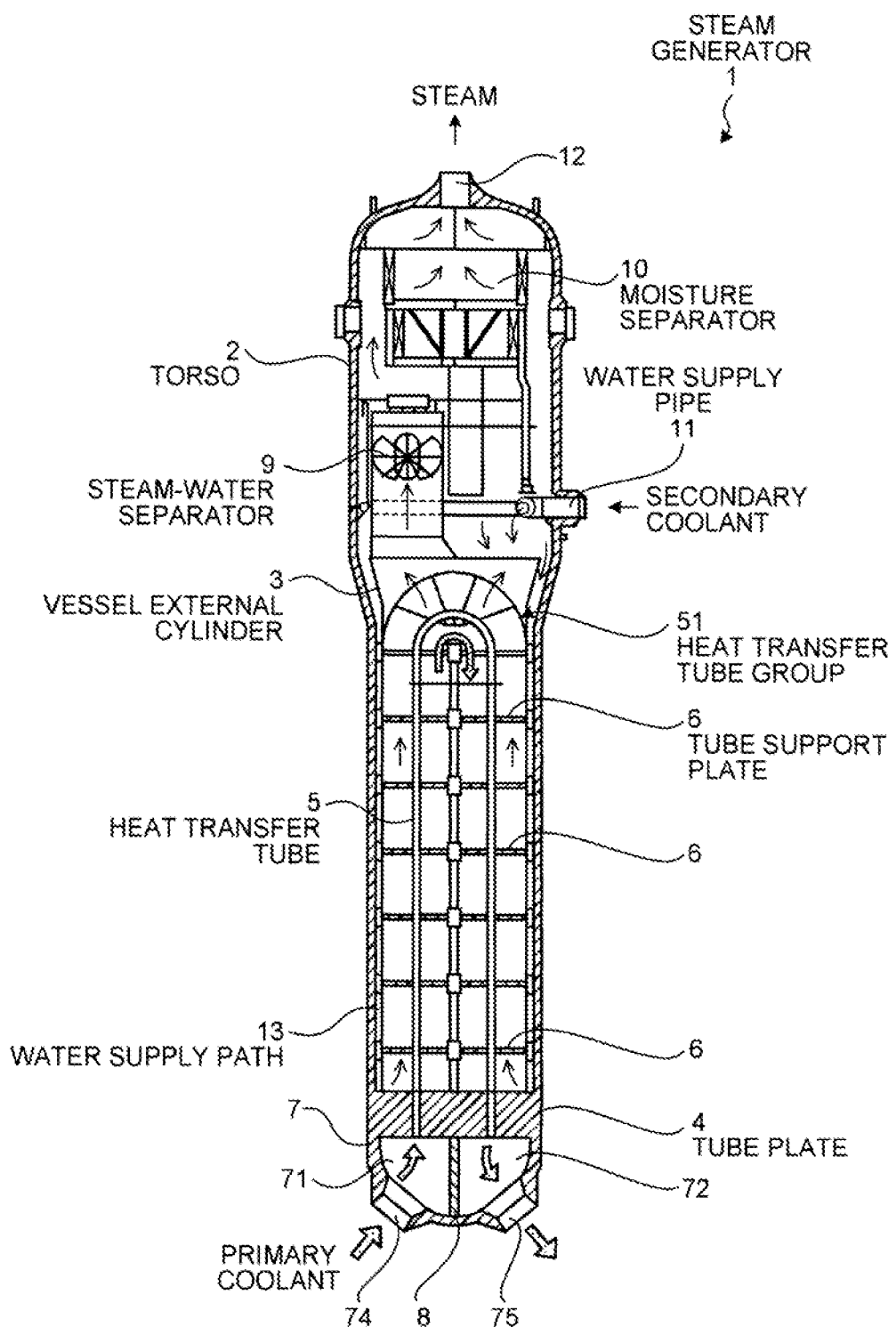
FIG. 1 is a schematic diagram of a side cross section of a steam generator in which a clearance increasing jig of a first embodiment is used.

FIG. 1 is a schematic diagram of a side cross section of a steam generator in which a clearance increasing jig of a first embodiment is used. As a heat exchanger having a plurality of heat transfer tubes therein, for example, a steam generator 1 used in a pressurized water reactor (PWR) is provided. A primary coolant (for example, light water) as a nuclear reactor coolant and a neutron moderator which are circulated in a nuclear reactor, and a secondary coolant which is circulated in a turbine flow into the steam generator 1. In the steam generator 1, the primary coolant which becomes in a high temperature and a high pressure exchanges heat with the secondary coolant to generate steam by evaporating the secondary coolant and further, cool the primary coolant which becomes in the high temperature and the high pressure.

Although described below in detail, a first vibration suppression member 14A preinstalled, which is attached in assembling the steam generator 1 and a second vibration suppression member 14B which is newly additionally installed after assembling the steam generator 1 (for example, after installing the steam generator 1) are attached to a plurality of heat transfer tubes 5 provided in the steam generator 1. In this case, the second vibration suppression member 14B is attached by using the clearance increasing jig. First, the steam generator 1 will be described with reference to FIG. 1.

The steam generator 1 increases vertically and further, has a sealed hollow cylindrical shape. The steam generator 1 has a torso 2 of which a lower portion has a slightly smaller diameter than an upper portion thereof. The torso 2 has a vessel external cylinder 3 having a cylindrical shape, which is spaced apart from an inner wall surface of the torso 2 by a predetermined clearance, in the lower portion thereof. The lower portion of the vessel external cylinder 3 is installed to extend up to the vicinity of a tube plate 4 disposed below the torso 2 in a lower portion of the torso 2. A heat transfer tube group 51 is provided in the vessel external cylinder 3. The heat transfer tube group 51 includes the plurality of heat transfer tubes 5 having an inverted U shape. In each heat transfer tube 5, the U-shaped circular arc portion is disposed to be convex upward, and a middle portion is supported on the vessel external cylinder 3 through a plurality of tube support plates 6 while both ends of a lower side are supported on the tube plate 4. A plurality of through-holes (not illustrated) is formed on the tube support plate 6, and each heat transfer tube 5 is inserted into the through-hole.

A water chamber 7 is provided on the bottom of the torso 2. The inside of the water chamber 7 is partitioned into an inlet chamber 71 and an outlet chamber 72 by a partition 8. The inlet chamber 71 is in communication with one end portion of each heat transfer tube 5 and the outlet chamber 72 is in communication with the other end portion of each heat transfer tube 5. An inlet nozzle 74 which leads to the outside of the torso 2 is formed in the inlet chamber 71 and an outlet nozzle 75 which leads to the outside of the torso 2 is formed in the outlet chamber 72. A cooling water pipe (not illustrated) to which the primary coolant is sent from the PWR is connected to the inlet nozzle 74 and a cooling water pipe (not illustrated) through which the primary coolant after heat exchange is sent to the PWR is connected to the outlet nozzle 75.

The torso 2 includes a steam-water separator 9 configured to separate the secondary coolant after heat exchange into steam (vapor phase) and hot water (liquid phase) and a moisture separator 10 configured to remove moisture of the separated steam to be close to dry steam, within an upper portion thereof. A water supply pipe 11 that supplies the secondary coolant into the torso 2 from the outside is inserted between the steam-water separator 9 and the heat transfer tube group 51. A steam exhaust hole 12 is formed on the top of the torso 2. A water supply path 13 that drops the second coolant supplied into the torso 2 from the water supply pipe 11 between the torso 2 and the vessel external cylinder 3 to return the secondary coolant to the tube plate 4, and lifts the secondary coolant along the heat transfer tube group 51 is formed in the lower portion of the torso 2. A cooling water pipe (not illustrated) configured to send steam to the turbine is connected to the steam exhaust hole 12 and a cooling water pipe (not illustrated) for supplying the secondary coolant acquired by cooling the steam used in the turbine with a condenser (not illustrated) is connected to the water supply pipe 11.

In the steam generator 1, the primary coolant heated by the PWR is sent to the inlet chamber 71 and circulated through the plurality of heat transfer tubes 5 to reach the outlet chamber 72. Meanwhile, the secondary coolant cooled by the moderator is sent to the water supply pipe 11 and lifted along the heat transfer tube group 51 through the water supply path 13 in the torso 2. In this case, the high-pressure and high-temperature primary coolant and the secondary coolant exchange heat with each other in the torso 2. The cooled primary coolant is returned to the PWR from the outlet chamber 72. Meanwhile, the secondary coolant which exchanges heat with the high-pressure and high-temperature primary coolant is lifted in the torso 2 and is separated into steam and hot water by the steam-water separator 9. Moisture is removed from the separated steam by using the moisture separator 10 and thereafter, the steam is sent to the turbine.

In the steam generator 1 configured as above, when the primary coolant passes through each heat transfer tube 5, fluid excitation vibration is generated in the circular arc portion having the inverted U shape. Therefore, a plurality of vibration suppression members 14 that suppresses vibration of the heat transfer tube 5 is provided at the circular arc portion of the heat transfer tube 5.

Figure 2:
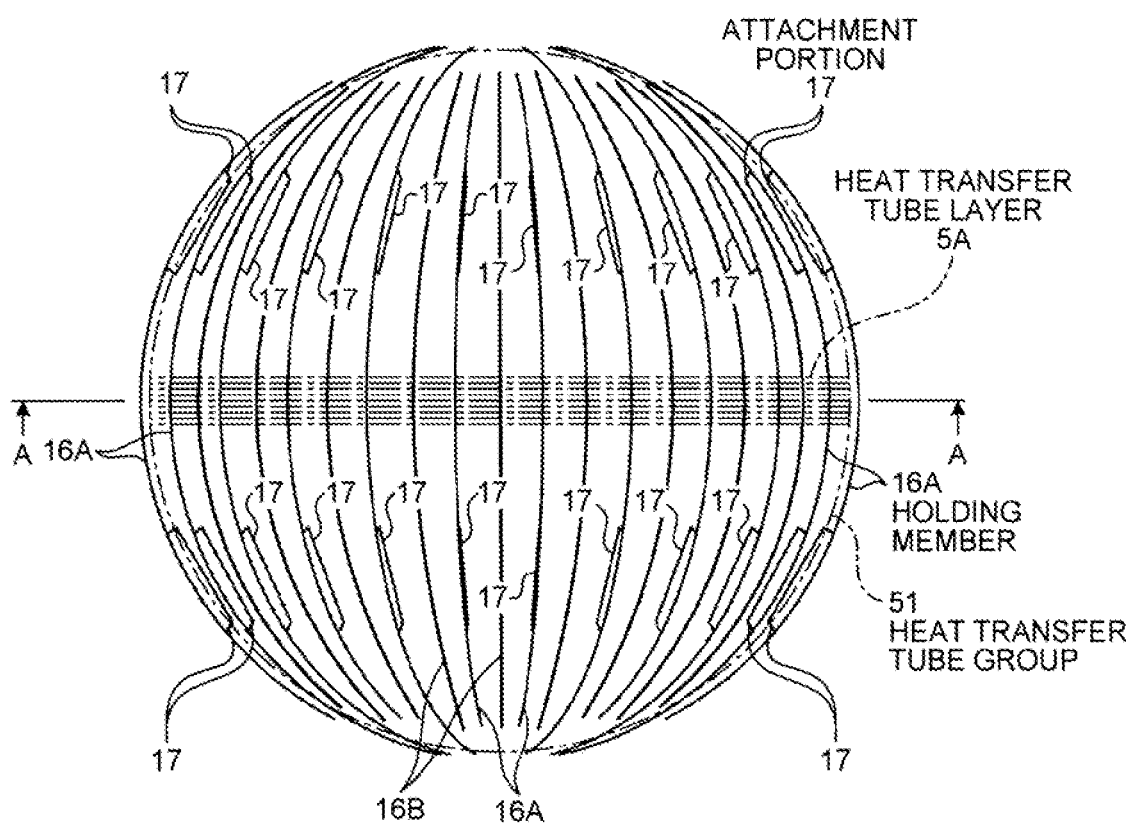
FIG. 2 is a schematic diagram when viewed from a plane of a heat transfer tube group.
Figure 3:
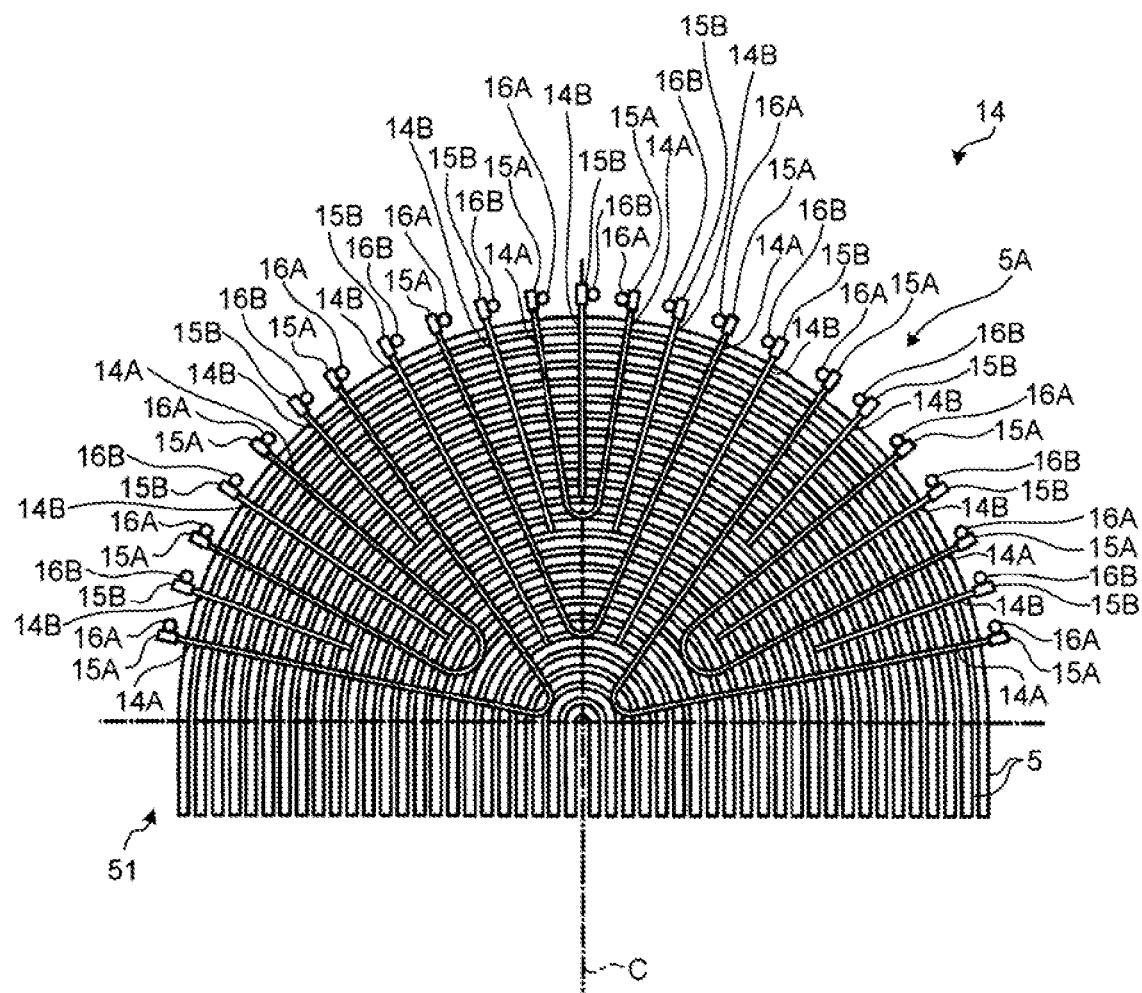
FIG. 3 is a cross-sectional view taken along the line A-A of FIG. 2.
Figure 4:
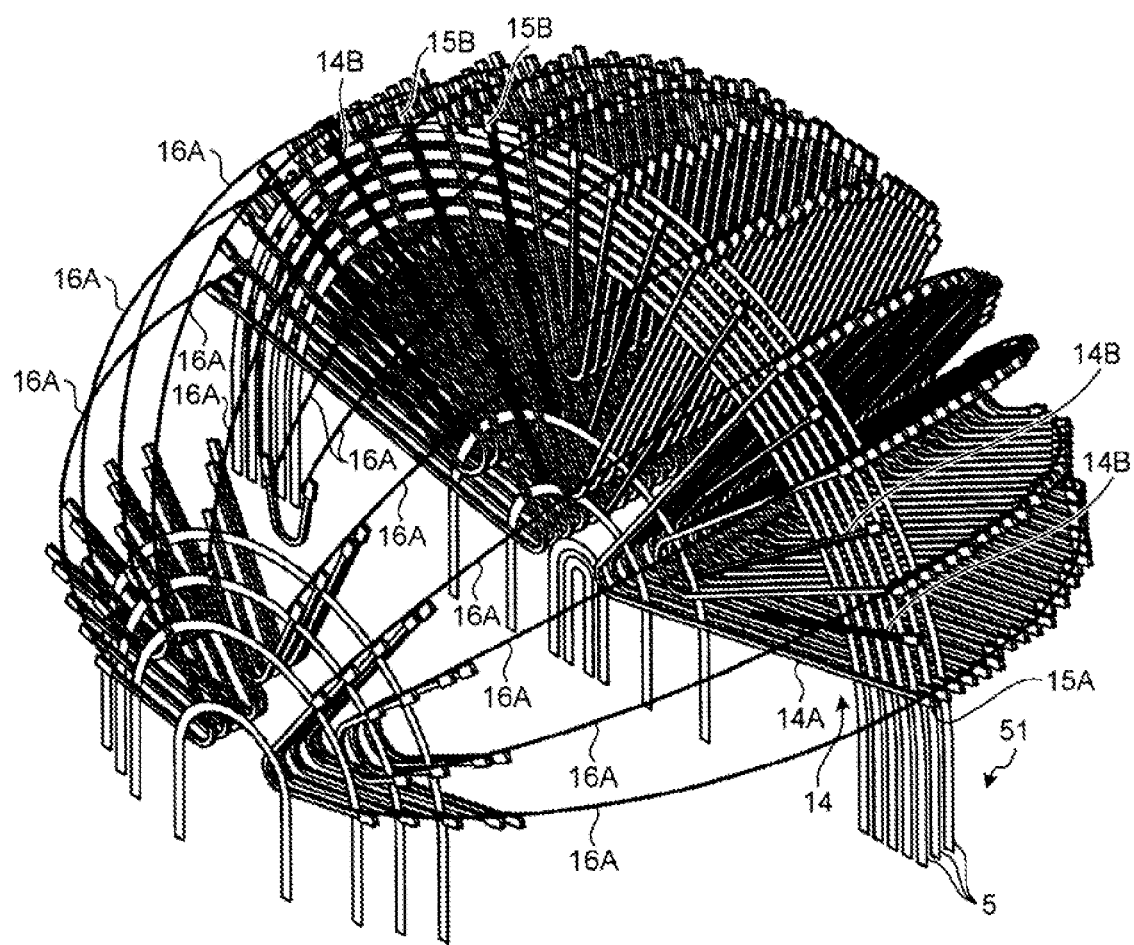
FIG. 4 is a perspective schematic view of the heat transfer tube group.

FIG. 2 is a schematic view when viewed from a plane of the heat transfer tube group. FIG. 3 is a cross-sectional view taken along the line A-A of FIG. 2. FIG. 4 is a perspective schematic view of the heat transfer tube group.

The circular arc portions of the plurality of heat transfer tubes 5 having the inverted U shape are disposed on the top of the heat transfer tube group 51 to have a semi-circular shape. That is, as illustrated in FIG. 3, each heat transfer tube 5 is bent in a predetermined curvature radius on a plane. As a result, the heat transfer tube 5 is bilaterally symmetric to each other through a center surface C which is an axial cross section of the heat transfer tube 5 passing through an apex which becomes the center of the circular arc portion and the center of the curvature radius. The plurality of heat transfer tubes 5 is provided in parallel so that axial directions are parallel to each other while the curvature radius is increased as the plurality of heat transfer tubes 5 faces the outside of a diameter direction of the curvature radius on each plane, thereby becoming heat transfer tube layers 5A.

As illustrated in FIG. 2, the heat transfer tube layers 5A are provided to be parallel by a predetermined clearance in an out-of-plane direction perpendicular to the in-plane direction. In the plurality of heat transfer tube layers 5A, as the respective heat transfer tubes 5 which are positioned at an outermost side of the diameter direction of the curvature radius on the plane face the outside of the out-of-plane direction, the curvature radius becomes smaller. As described above, the plurality of heat transfer tubes 5 are arranged in parallel, and as a result, the top of the heat transfer tube group 51 has the semi-circular shape.

Figure 5:
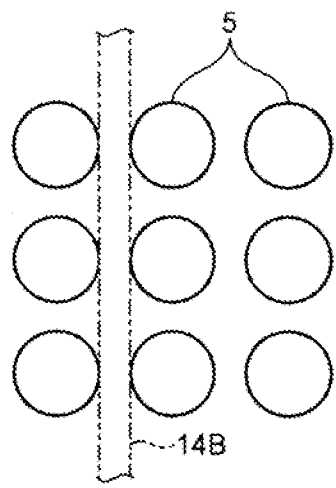
FIG. 5 is an axial cross-sectional view of one example of the heat transfer tube group on a center surface.
Figure 6:
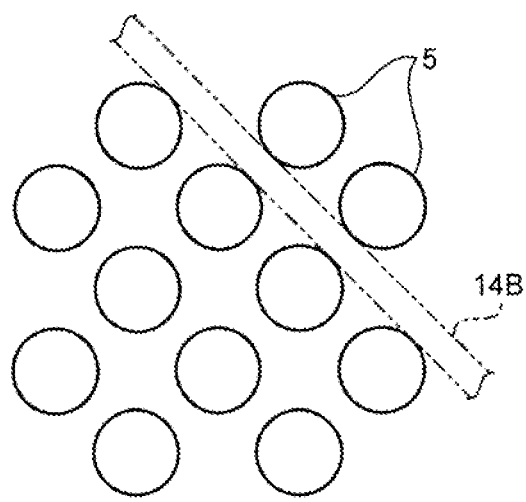
FIG. 6 is an axial cross-sectional view of one example of the heat transfer tube group on the center surface.

FIG. 5 is an axial cross-sectional view of one example of the heat transfer tube group on the center surface. FIG. 6 is an axial cross-sectional view of one example of the heat transfer tube group on the center surface. In the heat transfer tube group 51 provided as above, axial cross sections of the plurality of heat transfer tubes 5 on the center surface C thereof are disposed as illustrated in FIG. 5 or 6. As illustrated in FIG. 5, the plurality of heat transfer tubes 5 may be disposed in a lattice shape on the center surface C. As illustrated in FIG. 6, the plurality of heat transfer tubes 5 may be disposed in a zigzag shape on the center surface C. The plurality of vibration suppression members 14 is differently arranged according to arrangement of the plurality of heat transfer tubes 5.

As illustrated in FIG. 4, the plurality of vibration suppression members 14 is respectively inserted among the plurality of heat transfer tube layers 5A which is arranged in parallel. Each vibration suppression member 14 is made of a metallic material such as, for example, stainless, and the like. The plurality of vibration suppression members 14 includes a plurality of preinstalled (existing) first vibration suppression members 14A and a plurality of second vibration suppression members 14B to be additionally installed, as described above. In FIG. 4, some of the second vibration suppression members 14B to be additionally installed are exemplified and are not arranged as illustrated in FIG. 4.

As illustrated in FIG. 3, the first vibration suppression member 14A is formed by bending a bar body forming a rectangular cross section substantially in a V shape. In the first vibration suppression member 14A, a bent portion which is bent is arranged to be positioned at the center (inside) of a diameter direction in a curvature radius of the heat transfer tube 5 and both end portions thereof are arranged to be positioned outside the diameter direction. Both end portions of the first vibration suppression member 14A protrude outward from the heat transfer tube 5 which is provided at an outermost side of the diameter direction in the curvature radius.

As illustrated in FIG. 3, the plurality of first vibration suppression members 14A includes a V-shaped large first vibration suppression member 14A and a V-shaped small first vibration suppression member 14A. The V-shaped small first vibration suppression member 14A is arranged in the V-shaped large first vibration suppression member 14A to form a pair. For example, three groups of the first vibration suppression members 14A that form a pair are installed at a clearance of two heat transfer tube layers 5A which are adjacent (laminated) in an out-of-plane direction. Three groups of the first vibration suppression members 14A which form a pair are provided in a circumferential direction of the curvature radius. That is, among three groups, one group of the first vibration suppression members 14A which form a pair are provided at the center so that the bent portion thereof is positioned on the center surface C, and two groups of first vibration suppression members 14A which form a pair are respectively provided at both sides of the first vibration suppression members 14A which form a pair at the center.

As described above, the plurality of first vibration suppression members 14A is installed, and as a result, the ends of the plurality of first vibration suppression members 14A are, in parallel, arranged in line in the out-of-plane direction of the heat transfer tube layer 5A along a semi-circular arc of the heat transfer tube group 51, as illustrated in FIG. 4. The ends of the first vibration suppression members 14A which are provided in line are installed in plural columns by a predetermined clearance in the in-plane direction of the heat transfer tube layer 5A according to a semi-circular arc of the heat transfer tube group 51. That is, the ends of the plurality of first vibration suppression members 14A are arranged in the lattice shape.

The ends of the plurality of first vibration suppression members 14A are arranged in the lattice shape, and as a result, the clearance of the heat transfer tube layer 5A is partitioned into plural partitions in the in-plane direction of the heat transfer tube layer 5A and plural partitions in the out-of-plane direction of the heat transfer tube layer 5A. That is, the clearance of the heat transfer tube layer 5A is partitioned into plural partitions to have the lattice shape by the ends of the plurality of first vibration suppression member 14A. As a result, the clearance of the heat transfer tube layer 5A is prescribed by the first vibration suppression member 14A.

Bonding members 15A are respectively provided at both end portions of each first vibration suppression member 14A. The bonding member 15A is bonded to a holding member 16A to be described below, as illustrated in FIGS. 2 to 4. The bonding member 15A is made of the metallic material such as, for example, stainless, and the like.

The holding member 16A is a bar body having an arc shape on an outer periphery of a hemisphere shape of the heat transfer tube group 51, as illustrated in FIGS. 2 and 4. The holding member 16A is arranged so that the ends of the first vibration suppression members 14A which are in parallel arranged in line according to the semi-circular arc of the heat transfer tube group 51 are connected to each other. The bonding member 15A provided at the end of each first vibration suppression member 14A is bonded to the holding member 16A by welding, and the like. An attachment member 17 to be described below is bonded to the holding member 16A by the welding, and the like.

The attachment member 17 has a substantially U-shape, and is inserted between a heat transfer tube 5 provided at the outermost side of the diameter direction in the curvature radius and a heat transfer tube 5 provided inside thereof. Both end portions of the attachment member 17 are bonded to the holding member 16A by the welding, and the like to attach the holding member 16A to the heat transfer tube group 51.

The first vibration suppression member 14A having a V shape is used, but the first vibration suppression member having a rectangular parallelepiped shape (linear shape) is used or the first vibration suppression member having the V shape and the first vibration suppression member having the rectangular parallelepiped shape may coexist and be used and the first vibration suppression member 14A is not particularly limited.

As illustrated in FIG. 3, the second vibration suppression member 14B is formed by the bar body having the rectangular parallelepiped shape (linear shape) forming a rectangular cross section. The second vibration suppression member 14B is arranged so that a longitudinal direction thereof is the same as the diameter direction of the curvature radius. In the second vibration suppression member 14B, one longitudinal end thereof is arranged to be positioned at the center (inside) of the diameter direction in the curvature radius of the heat transfer tube 5 and the other longitudinal end thereof is arranged to be positioned outside the diameter direction. As a result, the second vibration suppression member 14B is inserted into the clearance of the heat transfer tubes 5 at one end side. The other end of the second vibration suppression member 14B protrudes outward from the heat transfer tube 5 which is provided at the outermost side of the diameter direction in the curvature radius.

In this case, an insertion path where the second vibration suppression member 14B is inserted into the clearance of the heat transfer tubes 5 is different according to arrangement of the plurality of heat transfer tubes 5 illustrated in FIGS. 5 and 6. That is, when the plurality of heat transfer tubes 5 is arranged in the lattice shape as illustrated in FIG. 5, the second vibration suppression member 14B may be inserted along the heat transfer tubes 5. Meanwhile, when the plurality of heat transfer tubes 5 is arranged in the zigzag shape as illustrated in FIG. 6, the second vibration suppression member 14B may be inserted obliquely at a predetermined angle throughout the heat transfer tubes 5. As described above, the insertion path of the second vibration suppression member 14B is not particularly limited, but an optimal insertion path may be set according to the arrangement of the plurality of heat transfer tubes 5. When the insertion path is a bent path having a plurality of bent portions, the second vibration suppression member 14B may be bent according to the insertion path.

The plurality of second vibration suppression members 14B is appropriately provided at a plurality of clearances of the heat transfer tube layer 5A having the lattice shape, which are partitioned by the ends of the plurality of first vibration suppression members 14A. For example, three second vibration suppression members 14B are provided with respect to one group of first vibration suppression members 14A which form a pair, respectively and two second vibration suppression members 14B may be provided between three groups of first vibration suppression members 14A which form a pair. Among three second vibration suppression members 14B which are provided with respect to one group of first vibration suppression members 14A which form a pair, one second vibration suppression member 14B is provided inside the V-shaped small first vibration suppression member 14A. The other two second vibration suppression members 14B are respectively provided between both end portions of the V-shaped small first vibration suppression member 14A and the both end portions of the V-shaped large first vibration suppression member 14A. Two second vibration suppression members 14B provided between three groups of first vibration suppression members 14A which form a pair are respectively provided between one group of first vibration suppression members 14A forming a pair, which are provided at the center and two groups of first vibration suppression members 14A forming a pair, which are provided at both sides thereof. The second vibration suppression member 14B has a rectangular cross-sectional shape, and the second vibration suppression member 14B and the heat transfer tube 5 linearly contact each other in that each heat transfer tube 5 is a circular tube.

As described above, the plurality of second vibration suppression members 14B is installed, and as a result, the ends of the plurality of second vibration suppression members 14B are in parallel arranged in line in the out-of-plane direction of the heat transfer tube layer 5A according to the semi-circular arc of the heat transfer tube group 51, similarly as the first vibration suppression member 14A although not illustrated. The ends of the second vibration suppression members 14B which are provided in line are installed in plural columns by a predetermined clearance in the in-plane direction of the heat transfer tube layer 5A according to the semi-circular arc of the heat transfer tube group 51.

Bonding members 15B are provided at the other end portions (the end portion outward in the diameter direction) of the respective second vibration suppression members 14B, respectively. The bonding member 15B is bonded to a holding member 16B to be described below, as illustrated in FIGS. 2 and 3. The bonding member 15B is made of the metallic material such as, for example, stainless, and the like.

The holding member 16B is substantially the same as the holding member 16A as illustrated in FIG. 2 and is a bar body which is formed in the arc shape on the semi-circular outer periphery of the heat transfer tube group 51. The holding member 16B is arranged so that the ends of the second vibration suppression members 14B which are in parallel arranged in line according to the semi-circular arc of the heat transfer tube group 51 are connected to each other. As a result, the holding member 16B is arranged between the adjacent holding members 16A. The bonding member 15B provided at the other end of each second vibration suppression member 14B is bonded to the holding member 16B by the welding, and the like.

Figure 7:
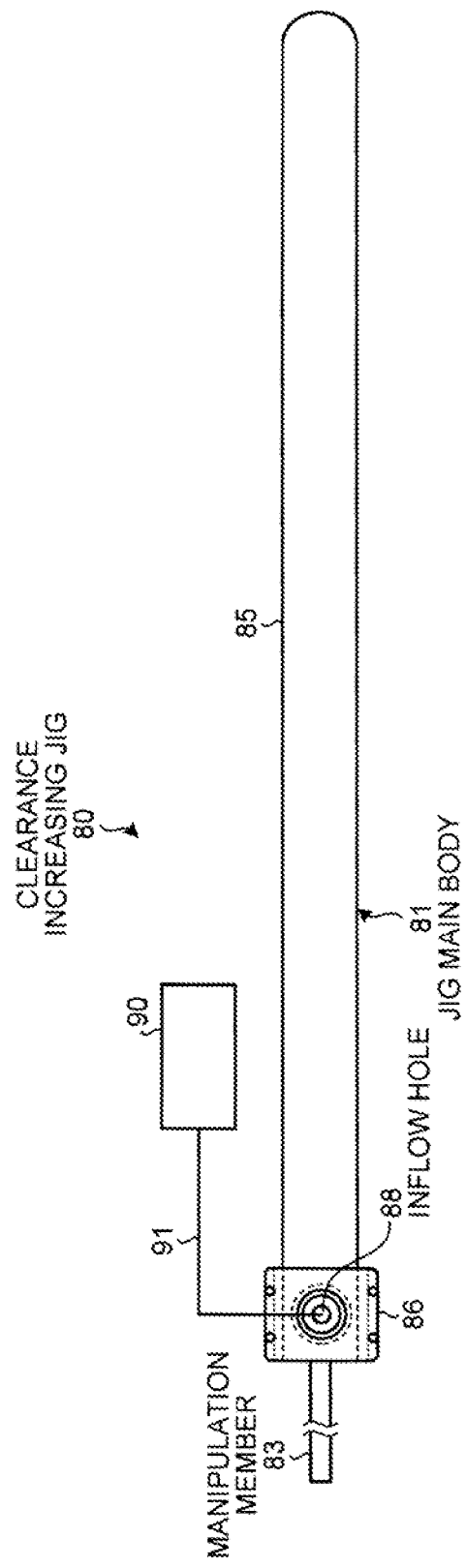
FIG. 7 is a plan view of the clearance increasing jig according to the first embodiment when viewed from a front surface.
Figure 8:
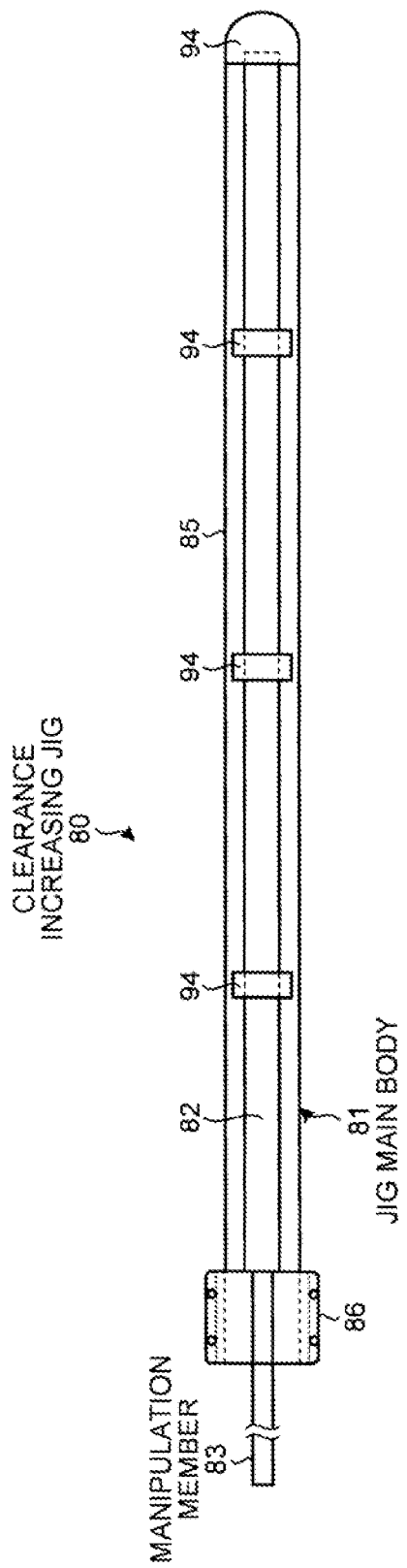
FIG. 8 is a plan view of the clearance increasing jig according to the first embodiment when viewed from a rear surface.
Figure 9:
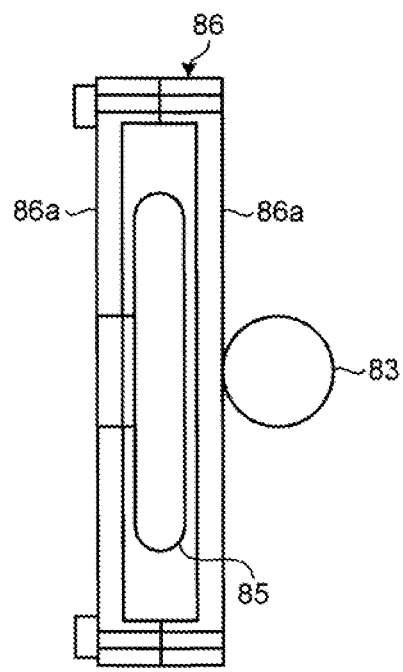
FIG. 9 is a cross-sectional view of the clearance increasing jig according to the first embodiment.

Subsequently, referring to FIGS. 7 to 9, a clearance increasing jig 80 will be described. FIG. 7 is a plan view of the clearance increasing jig according to the first embodiment when viewed from a front surface. FIG. 8 is a plan view of the clearance increasing jig according to the first embodiment when viewed from a rear surface. FIG. 9 is a cross-sectional view of the clearance increasing jig according to the first embodiment. In the following description, a case in which the clearance increasing jig 80 is used when the second vibration suppression member 14B is additionally installed in the pre-installed steam generator 1 will be described. However, the clearance increasing jig 80 is not limited to this using method. For example, the clearance increasing jig 80 may be used when the second vibration suppression member 14B is attached at the time of assembling the steam generator 1.

When the second vibration suppression member 14B is additionally installed in the preinstalled steam generator 1, the plurality of heat transfer tubes 5 is under an environment in which the heat transfer tubes 5 are submerged in water (underwater environment) in order to reduce an influence from neutrons. As a result, the clearance increasing jig 80 is used under the underwater environment. The clearance increasing jig 80 includes a jig main body 81, a guide member 82, and a manipulation member 83.

The jig main body 81 includes a balloon part (increasing unit) 85 which is flexibly expandable and a rear end member 86 attached to the balloon part 85. The balloon part 85 is extended in a longitudinal direction and configured by bonding two sheets on the periphery. A fluid flows into the balloon part 85, which is expandable. In the balloon part 85, one longitudinal end is an insertion-direction front end and the other longitudinal end is an insertion-direction rear end. The rear end member 86 is provided at a rear end of the balloon part 85. As illustrated in FIG. 9, the rear end member 86 is configured by butt-screwing both ends of a pair of concave-shaped members 86a having a concave-shaped cross section and the balloon part 85 is held in an internal space formed by butting the pair of concave-shaped members 86a. An inflow hole 88 which is a circular aperture is formed at the rear end member 86 and the inflow hole 88 is in communication with up to the inside of the balloon part 85. A fluid supply device 90 is connected to the inflow hole 88 through a supply pipe 91 and the fluid supply device 90 supplies a fluid for expanding the balloon part 85 toward the inflow hole 88. As the fluid, water may be used, but the fluid is not limited to the water and air, and the like may be used. As such, the fluid flows into the jig main body 81, which is expandable.

The balloon part 85 before expansion, into which the fluid does not flow, is formed in a thin flexible sheet shape. Meanwhile, the balloon part 85 after expansion, into which the fluid flows through the inflow hole 88, is larger than the clearance of the heat transfer tubes 5. That is, the balloon part 85 after expansion is longer than the length of the first vibration suppression member 14A in the out-of-plane direction.

The guide member 82 is provided on one surface of the balloon part 85, and provided in a longitudinal direction along the balloon part 85. The guide member 82 is configured by, for example, a metallic thin plate and is transformable to a predetermined shape according to the insertion path of the clearance of the heat transfer tubes. The guide member 82 is held by a plurality of restraining members 94 provided on one surface of the balloon part 85.

The manipulation member 83 is configured by a circular pipe and one axial end of the manipulation member 83 is bonded to the rear end member 86 by the welding, and the like. In this case, the manipulation member 83 is bonded in the same direction as the longitudinal direction of the balloon part 85.

Figure 10:
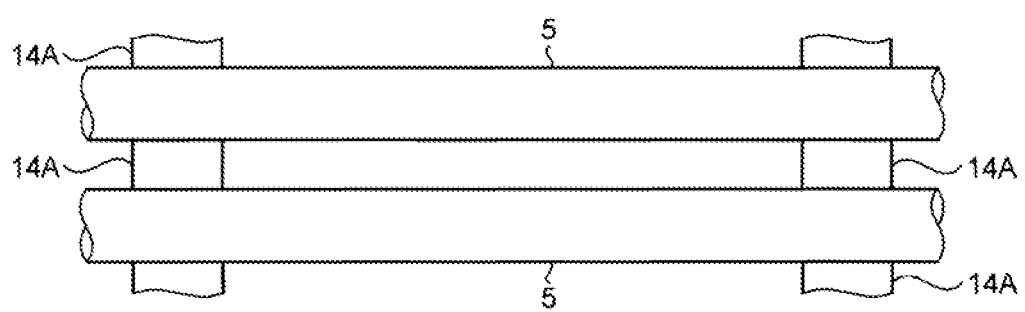
FIG. 10 is an explanatory diagram of one example of an additional installation method of the vibration suppression member using the clearance increasing jig of the first embodiment.
Figure 22:
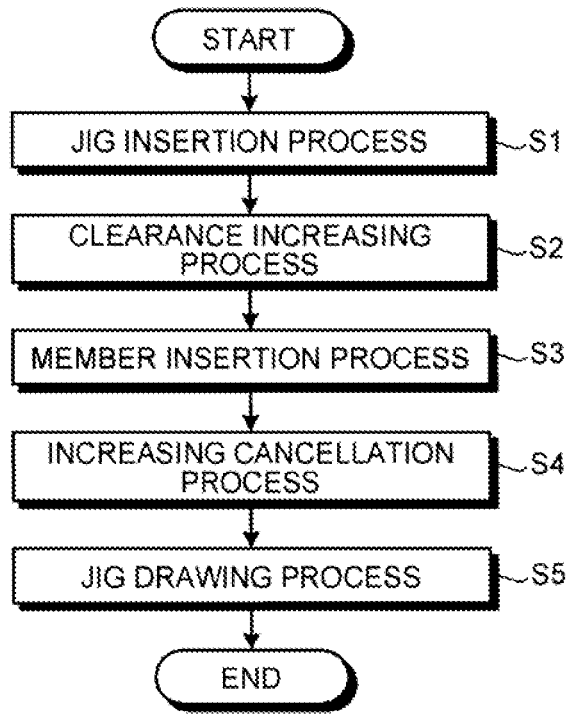
FIG. 22 is a flowchart of an additional installation method of the vibration suppression member.

Subsequently, referring to FIGS. 10 to 15, and 22, an additional installation method of the vibration suppression member 14 in which the second vibration suppression member 14B is newly additionally installed in the preinstalled steam generator 1 will be described. FIGS. 10 to 15 are explanatory diagrams of one example of the additional installation method of the vibration suppression member using the clearance increasing jig of the first embodiment. FIG. 22 is a flowchart of the additional installation method of the vibration suppression member. As illustrated in FIG. 10, in the preinstalled steam generator 1 before installing the second vibration suppression member 14B, the plurality of heat transfer tube layers 5A (only the heat transfer tube 5 at the outermost side is illustrated in FIG. 10) is installed at a predetermined clearance, and as a result, the plurality of heat transfer tubes 5 at the outermost side is arranged in parallel, in the heat transfer tube group 51. The plurality of first vibration suppression members 14A is provided at the clearances of the adjacent heat transfer tube layers 5A, and the ends of the plurality of first vibration suppression members 14A are arranged in the lattice shape. As a result, the width of the clearance of the adjacent heat transfer tube layers 5A is prescribed by the first vibration suppression member 14A which are provided at the clearance.

Figure 11:
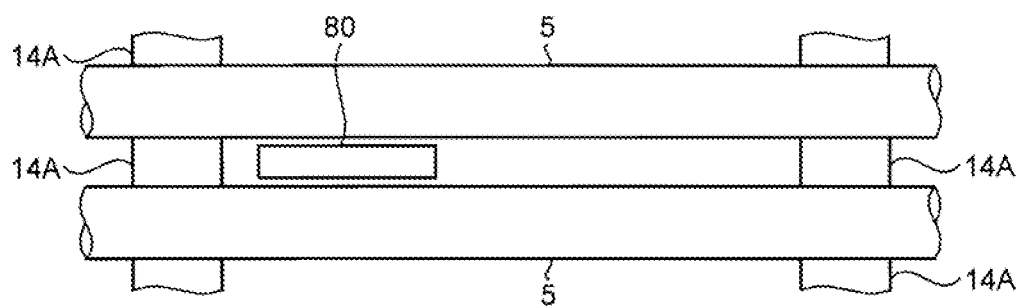
FIG. 11 is an explanatory diagram of one example of an additional installation method of the vibration suppression member using the clearance increasing jig of the first embodiment.

When the second vibration suppression member 14B is additionally installed in the preinstalled steam generator 1, the plurality of heat transfer tubes 5 is under the underwater environment, and as a result, the jig main body 81 is first manipulated by using the manipulation member 83 and the jig main body 81 before expansion is inserted into the predetermined clearance of the heat transfer tubes 5, as illustrated in FIG. 11 (jig insertion process: step S1 of FIG. 22). In the jig insertion process (S1), the jig main body 81 is inserted into the insertion path illustrated in FIG. 5 or 6. In the jig insertion process (S1), the balloon part 85 is inserted along the insertion path while the balloon part 85 is guided by the guide member 82.

Figure 12:
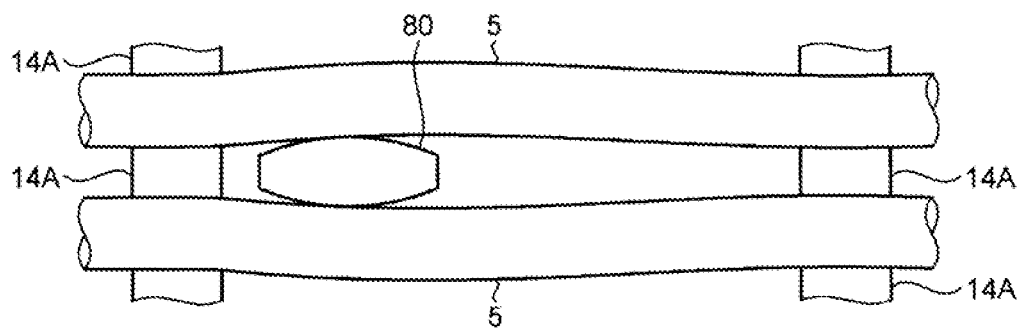
FIG. 12 is an explanatory diagram of one example of an additional installation method of the vibration suppression member using the clearance increasing jig of the first embodiment.
Figure 13:
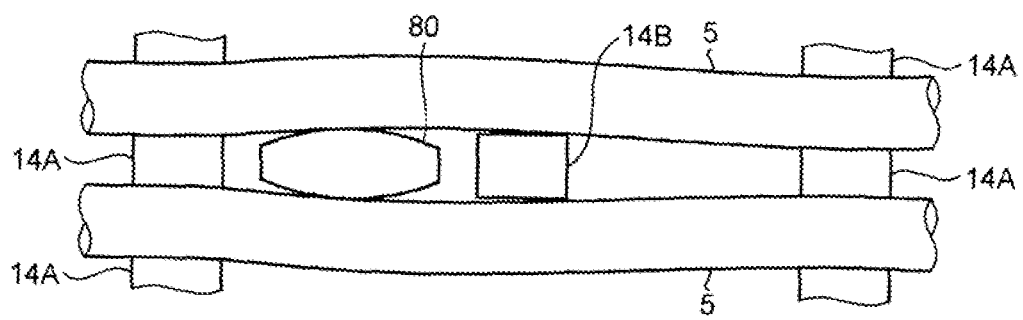
FIG. 13 is an explanatory diagram of one example of an additional installation method of the vibration suppression member using the clearance increasing jig of the first embodiment.

After the jig main body 81 is inserted, the fluid supply device 90 supplies the fluid to the inside of the balloon part 85 through the supply pipe 91, as illustrated in FIG. 12. When the fluid is supplied, the jig main body 81 increases the clearance of the heat transfer tubes 5 as the balloon part 85 is increased (clearance increasing process: step S2 of FIG. 22). When the clearance of the heat transfer tubes 5 is increased, the second vibration suppression member 14B is inserted while the clearance is increased, as illustrated in FIG. 13 (member insertion process: step S3 of FIG. 22).

Figure 14:
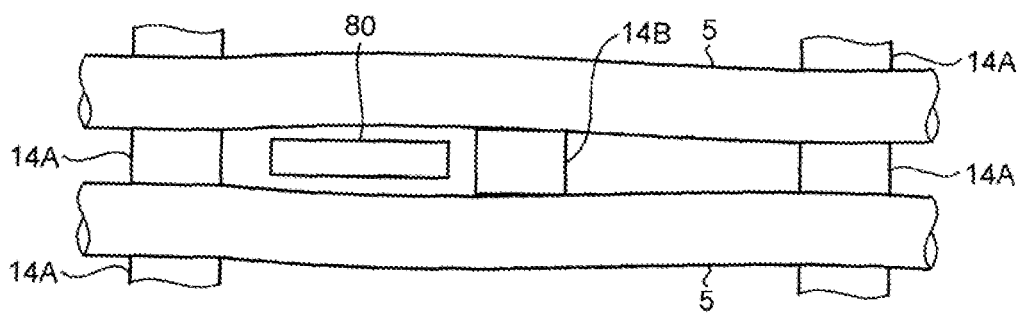
FIG. 14 is an explanatory diagram of one example of an additional installation method of the vibration suppression member using the clearance increasing jig of the first embodiment.
Figure 15:
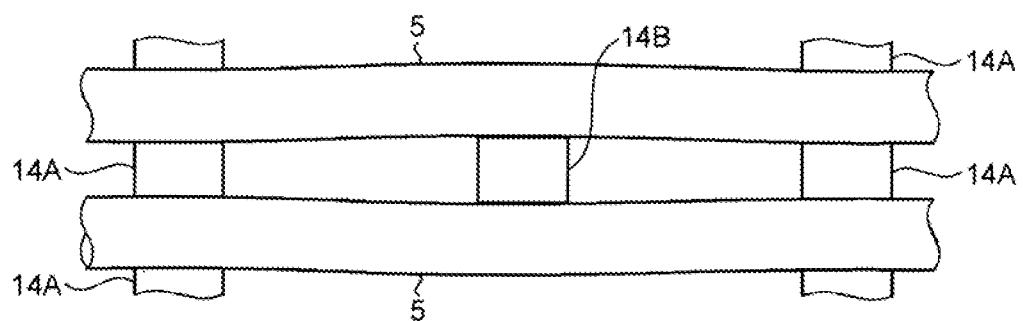
FIG. 15 is an explanatory diagram of one example of an additional installation method of the vibration suppression member using the clearance increasing jig of the first embodiment.

When the second vibration suppression member 14B is inserted, the supply of the fluid from the fluid supply device 90 stops and the pressure is released. Then, the jig main body 81 is depressurized, and as a result, some of the fluid flow out through the inflow hole 88 from the inside. When the fluid flows out, the jig main body 81 cancels the increasing of the clearance of the heat transfer tubes 5 as the balloon part 85 is deflated, as illustrated in FIG. 14 (increasing cancellation process: step S4 of FIG. 22). When the increasing of the clearance by the jig main body 81 is cancelled, the inserted second vibration suppression member 14B is engaged by the heat transfer tubes 5 to contact the heat transfer tubes 5. In addition, as illustrated in FIG. 15, since the jig main body 81 in which the balloon part 85 is deflated is smaller than the clearance of the heat transfer tube 5, the jig main body 81 is drawn from the clearance by manipulating the manipulation member 83 in this state (jig drawing process: step S5 of FIG. 22). As a result, the additional installation of the second vibration suppression member 14B ends. By repeating these processes, the plurality of second vibration suppression members 14B is additionally installed.

As described above, according to the configuration of the first embodiment, the second vibration suppression member 14B may be newly arranged by using the clearance increasing jig 80, in addition to the preinstalled first vibration suppression member 14A. In this case, the clearance increasing jig 80 allows the fluid to flow into the jig main body 81 through the inflow hole 88 to increase the balloon part 85 of the jig main body 81. As a result, the clearance of the heat transfer tubes 5 may be increased by the balloon part 85. In this state, since the second vibration suppression member 14B may be inserted into the clearance of the heat transfer tubes 5, the second vibration suppression member 14B may be appropriately inserted. In addition, since the inserted second vibration suppression member 14B may contact each heat transfer tube 5, the vibration of each heat transfer tube 5 may be appropriately suppressed. Accordingly, in the steam generator 1, abrasion may be reduced at a contact portion between the heat transfer tube 5 and the vibration suppression member 14.

Further, according to the configuration of the first embodiment, the balloon part 85 may be smaller than the clearance before the fluid flows in and may be increased to be larger than the clearance after the fluid flows in. As a result, the jig main body 81 before the fluid flows in may be easily inserted into the clearance of the heat transfer tubes 5. Further, the fluid flows into the jig main body 81 to significantly increase the clearance of the heat transfer tubes 5.

In addition, according to the configuration of the first embodiment, since the jig main body 81 may be inserted along the insertion path by the guide member 82, the jig main body 81 may be appropriately inserted even when the insertion path formed according to the arrangement of the plurality of heat transfer tubes 5 is bent.

Second Embodiment

Figure 16:
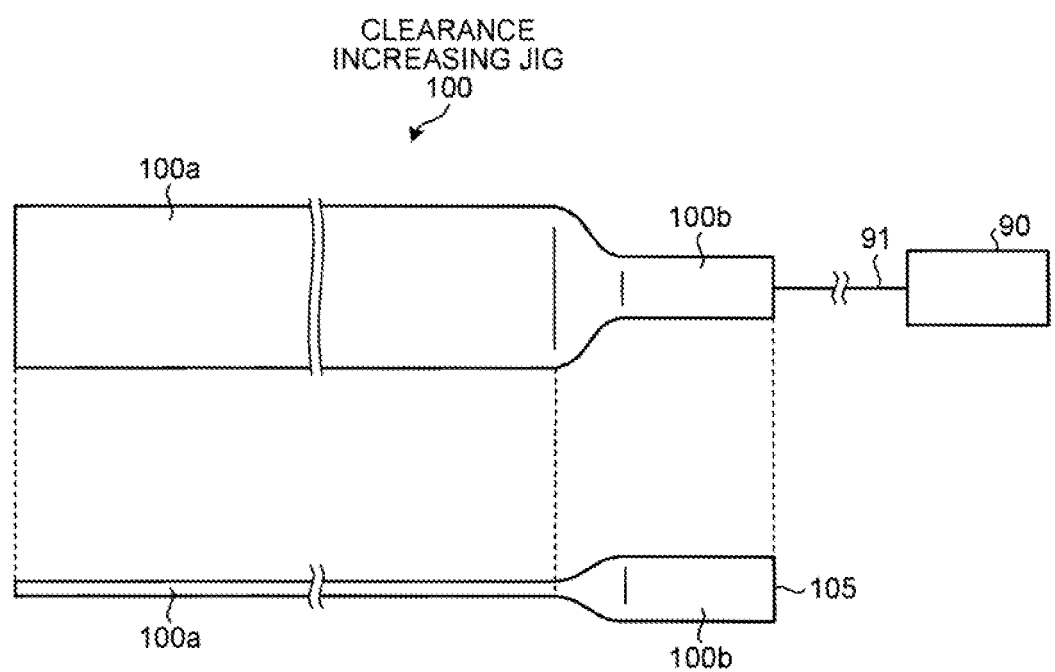
FIG. 16 is a configuration diagram of a plane and a side of a clearance increasing jig according to a second embodiment.

Subsequently, referring to FIG. 16, a clearance increasing jig 100 according to a second embodiment will be described. Further, in the second embodiment, only parts different from the first embodiment will be described in order to avoid duplicate description with the first embodiment. FIG. 16 is a configuration diagram of a plane and a side of the clearance increasing jig according to the second embodiment. The clearance increasing jig 100 of the second embodiment is configured by processing a circular pipe. Hereinafter, referring to FIG. 16, the clearance increasing jig 100 according to the second embodiment will be described.

The clearance increasing jig 100 according to the second embodiment is acquired by press-processing the circular pipe having apertures at both axial sides. In the clearance increasing jig 100, one aperture of the circular pipe is plastically deformed in a flat shape. Further, a flat portion 100a of the plastically deformed circular pipe is in a larger range than a cylinder portion 100b which is not plastically deformed. The flat portion 100a has a space in which the fluid is flowable therein. The flat portion 100a before expansion, in which the fluid does not flow, is smaller than the clearance of the heat transfer tubes 5. That is, the flat portion 100a before expansion is shorter than the length of the first vibration suppression member 14A in the out-of-plane direction. Meanwhile, the flat portion 100a after expansion, in which the fluid flows, is larger than the clearance of the heat transfer tubes 5. That is, the flat portion 100a after expansion is longer than the length of the first vibration suppression member 14A in the out-of-plane direction. One aperture in the flat portion 100a is bonded by the welding, and the like to be encapsulated. Meanwhile, the other aperture in the cylinder portion 100b is used as an inflow hole 105.

As described above, according to the configuration of the second embodiment, the clearance increasing jig 100 may be easily manufactured by performing simple processing of the circular pipe. Further, in the second embodiment, although the circular pipe is processed, a square pipe may be used in the case of a pipe body.

Third Embodiment

Figure 17:
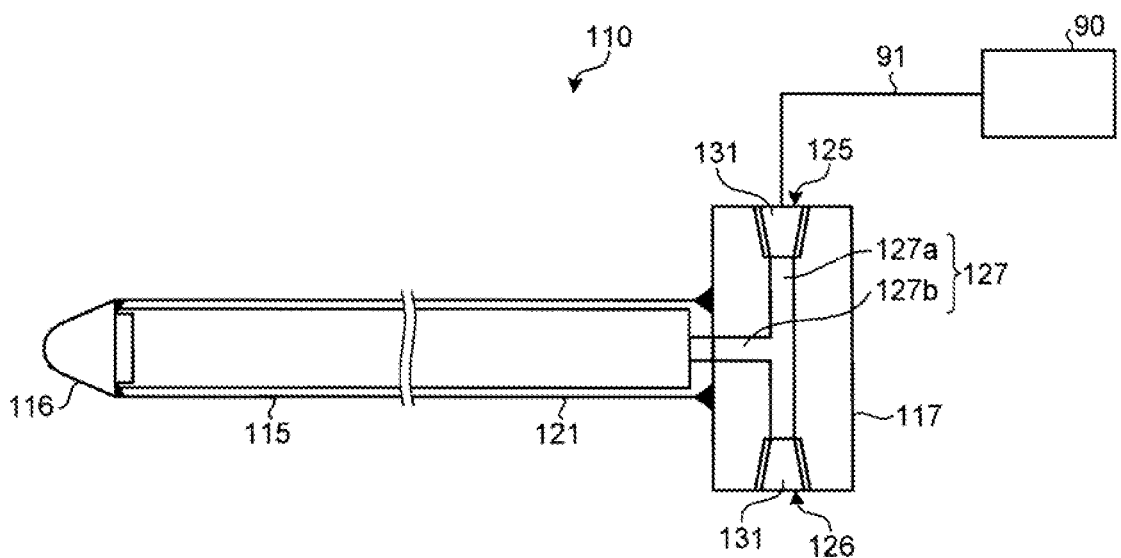
FIG. 17 is a side cross-sectional view of a clearance increasing jig according to a third embodiment.
Figure 18:
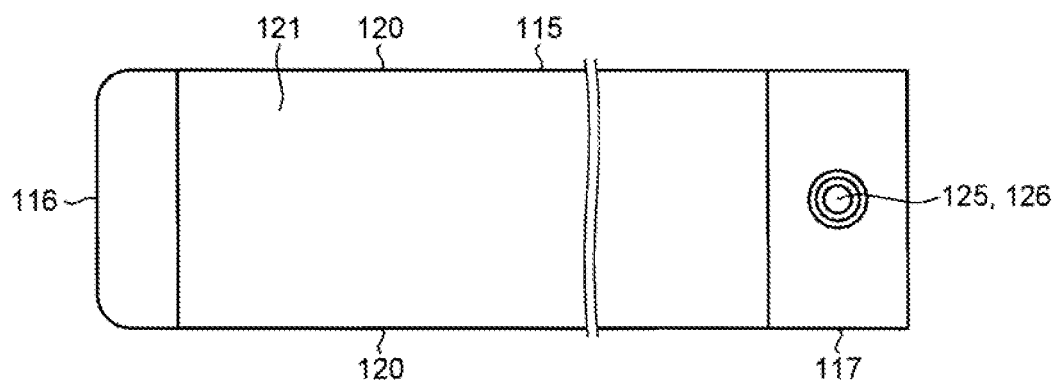
FIG. 18 is a plan view of the clearance increasing jig according to the third embodiment.

Subsequently, referring to FIGS. 17 to 19, a clearance increasing jig 110 according to a third embodiment will be described. Further, even in the third embodiment, only parts different from the first embodiment will be described in order to avoid duplicate description with the first embodiment. FIG. 17 is a side cross-sectional view of the clearance increasing jig according to the third embodiment. FIG. 18 is a plan view of the clearance increasing jig according to the third embodiment. FIG. 19 is a cross-sectional view of the clearance increasing jig according to the third embodiment. In the clearance increasing jig 80 of the first embodiment, the balloon part 85 has flexibility, but in the clearance increasing jig 110 of the third embodiment, a jig main body 111 has rigidity. Hereinafter, referring to FIGS. 17 to 19, the clearance increasing jig 110 according to the third embodiment will be described.

The clearance increasing jig 110 of the third embodiment includes a square cylinder body (increasing unit) 115, a front end member 116, and a rear end member 117, as the jig main body 111.

The square cylinder body 115 is configured by a cylinder body having a square cross section, which has four sides, and extends in a longitudinal direction and has apertures at both longitudinal sides. The square cylinder body 115 is configured by forming a groove that increases in the longitudinal direction by butting both ends of a pair of concave-shaped members 115a having a concave-shaped cross section and bonding the groove through the welding, and the like. The square cylinder body 115 configured as above has a pair of non-contact portions 120 which does not contact the heat transfer tube 5 at a pair of sides facing each other, where a pair of welding portions M is formed. In this case, the pair of welding portions M serve as rib portions that reinforce the pair of non-contact portions 120, respectively. As such, in each non-contact portion 120, since rigidity is increased by each welding portion M, axial bending deformation of the square cylinder body 115 is difficult to occur. Meanwhile, the square cylinder body 115 has contact portions 121 which contact the heat transfer tube 5 at a pair of sides facing each other, where a pair of welding portions M are not formed. In this case, as illustrated in FIG. 19, a plate thickness of the square cylinder body 115 at each non-contact portion 120 is larger than that of the square cylinder body 115 at each contact portion 121. Further, angled portions on an inner surface of the square cylinder body 115 are formed by curved surfaces capable of dispersing stress. The fluid flows into the square cylinder body 115 configured as above, which is expandable.

The square cylinder body 115 before expansion, in which the fluid does not flow, is smaller than the clearance of the heat transfer tubes 5. That is, the square cylinder body 115 before expansion is shorter than the length of the first vibration suppression member 14A in the out-of-plane direction. Meanwhile, the square cylinder body 115 after expansion, in which the fluid flows, is larger than the clearance of the heat transfer tubes 5. That is, the square cylinder body 115 after expansion is longer than the length of the first vibration suppression member 14A in the out-of-plane direction.

The front end member 116 fits in one aperture of the square cylinder body 115 and is bonded by the welding, and the like to encapsulate one aperture. The front end member 116 is formed in a tapered shape in which the end thereof is tapered toward a longitudinal front end in a direction in which the contact portions 121 face each other, that is, a direction in which the heat transfer tubes 5 face each other.

The rear end member 117 fits in the other aperture of the square cylinder body 115 and is bonded by the welding, and the like to encapsulate the other aperture. The rear end member 117 is larger than the clearance of the heat transfer tube 5 and includes an inflow hole 125, an outflow hole 126, and a path 127 configured to connect the inflow hole 125, the outflow hole 126, and the inside of the square cylinder body 115. An opening/closing valve 131 is provided in each of the inflow hole 125 and the outflow hole 126. Further, the fluid supply device 90 is connected to the inflow hole 125 through the supply pipe 91.

The path 127 includes a first path 127a connecting the inflow hole 125 and the outflow hole 126, and a second path 127b which is branched from the first path 127a to reach the inside of the square cylinder body 115. The first path 127a increases in a direction perpendicular to the longitudinal direction. The second path 127b increases in the longitudinal direction. In addition, the first path 127a and the second path 127b are provided to be perpendicular to each other.

When the opening/closing valve 131 of the inflow hole 125 is opened and the opening/closing valve 131 of the outflow hole 126 is closed while the fluid is supplied from the fluid supply device 90 through the supply pipe 91, the fluid flows into the square cylinder body 115 by passing through the first path 127a and the second path 127b through the inflow hole 125. When the fluid flows into the square cylinder body 115, the square cylinder body 115 is expanded. As a result, the square cylinder body 115 is capable of increasing the clearance of the heat transfer tubes 5.

Meanwhile, when the opening/closing valve 131 of the inflow hole 125 is closed and the opening/closing valve 131 of the outflow hole 126 is opened while the supply of the fluid from the fluid supply device 90 stops, the fluid flows to the outside of the square cylinder body 115 from the outflow hole 126 by passing through the second path 127b and the first path 127a. When the fluid flows out from the inside of the square cylinder body 115, the square cylinder body 115 is contracted (deflated). As a result, the square cylinder body 115 is easily drawn from the clearance of the heat transfer tubes 5.

As described above, even in the configuration of the third embodiment, the second vibration suppression member 14B may be newly arranged by using the clearance increasing jig 110, in addition to the preinstalled first vibration suppression member 14A. In this case, the clearance increasing jig 110 allows the fluid to flow into the jig main body 111 through the inflow hole 125 to increase the square cylinder body 115 of the jig main body 111. As a result, the clearance of the heat transfer tubes 5 may be increased by the square cylinder body 115. In this state, since the second vibration suppression member 14B may be inserted into the clearance of the heat transfer tubes 5, the second vibration suppression member 14B may be appropriately inserted. In addition, since the inserted second vibration suppression member 14B may contact each heat transfer tube 5, the vibration of each heat transfer tube 5 may be appropriately suppressed. Accordingly, in the steam generator 1, abrasion may be reduced at a contact portion between the heat transfer tube 5 and the vibration suppression member 14.

Further, according to the configuration of the third embodiment, the front end member 116 and the rear end member 117 are attached to both longitudinal sides of the square cylinder body 115, respectively, to configure the jig main body 111. As a result, since the fluid flows into the square cylinder body 115 to expand the square cylinder body 115, the clearance of the heat transfer tubes 5 may be appropriately increased.

Further, according to the configuration of the third embodiment, since the thickness of the square cylinder body 115 at the contact portion 121 may be thin, the contact portion 121 side of the square cylinder body 115 may be easily expanded. In addition, for example, the thickness of the square cylinder body 115 at the non-contact portion 120 is increased or the pair of welding portions M are provided, and as a result, the rigidity of the square cylinder body 115 at the non-contact portion 120 side may be higher than that of the square cylinder body 115 at the contact portion 121 side, and the square cylinder body 115 may be difficult to bend along the non-contact portion 120 (longitudinal direction). That is, the rigidity of the square cylinder body 115 at the non-contact portion 120 side is higher than that of the square cylinder body 115 at the contact portion 121 side, and as a result, the non-contact portion 120 side of the square cylinder body 115 serves as a rib and is difficult to bend in an axial direction of the square cylinder body 115. Therefore, the square cylinder body 115 may be inserted directly into the clearance of the heat transfer tubes 5.

Further, according to the configuration of the third embodiment, since the angled portions on the inner surface of the square cylinder body 115 may be formed in the curved surfaces, stress which is concentrated on the inner surface of the angled portion due to the fluid that flows into the square cylinder body 115 may be reduced. Therefore, deformation of the square cylinder body 115 by the stress may be suppressed and tolerance of the jig main body 111 may be improved.

Further, according to the configuration of the third embodiment, since the front end member 116 may be tapered in the direction where the heat transfer tubes 5 face each other, the front end member 116 may be easily inserted into the clearance of the heat transfer tubes 5.

In addition, according to the configuration of the third embodiment, since the rear end member 117 may be larger than the clearance of the heat transfer tubes 5, the jig main body 111 may be suppressed from dropping to the clearance of the heat transfer tubes 5.

Further, according to the configuration of the third embodiment, the first path 127a may be provided to extend in the direction perpendicular to the longitudinal direction. As a result, the rear end member 117 may extend in the direction perpendicular to the longitudinal direction of the jig main body 111. Therefore, the rear end member 117 may be difficult to drop to the clearance of the heat transfer tubes 5.

In addition, in the third embodiment, the front end member 116 is tapered in the direction where the heat transfer tubes 5 face each other, but is not limited to this configuration and may have a configuration of Modified Example 1 illustrated in FIG. 20. That is, the front end member 116 may be formed in the tapered shape in which the end thereof is tapered toward the longitudinal front end in a direction in which the non-contact portions 120 face each other, that is, the axial direction of the heat transfer tube 5. According to this configuration, the front end member 116 may be easily inserted by the clearance of the heat transfer tubes 5.

Figure 21:
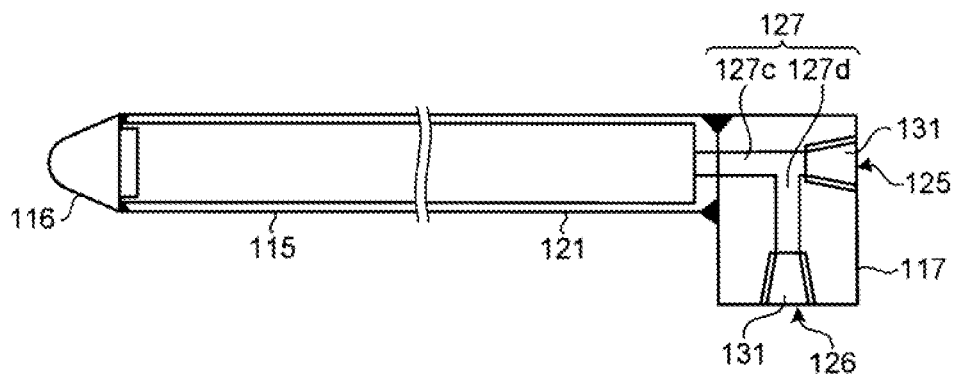
FIG. 21 is a side cross-sectional view of a clearance increasing jig according to Modified Example 2.

Further, in the third embodiment, the path 127 includes the first path 127a and the second path 127b, but is not limited to the configuration and may have a configuration of Modified Example 2 illustrated in FIG. 21. That is, the path 127 includes a third path 127c configured to connect the inflow hole 125 and the inside of the square cylinder body 115 and a fourth path 127d that is branched from the third path 127c to reach the outflow hole 126. The third path 127c extends in the longitudinal direction. The fourth path 127d extends in a direction perpendicular to the longitudinal direction. In addition, the third path 127c and the fourth path 127d are provided to be perpendicular to each other. According to this configuration, the inflow hole 125 and the outflow hole 126 may be arranged differently from each other by 90°, and the fourth path 127d may be a path shorter than the first path 127a described above, and as a result, the rear end member 117 may have a simple configuration.

Further, the first to third embodiments may be appropriately combined. For example, the manipulation member 83 of the first embodiment may be provided in the third embodiment and the outflow hole 126 of the third embodiment may be provided in the first embodiment.

According to the embodiments, a fluid flows into a jig main body through an inflow hole to increase an increasing unit provided in the jig main body. As a result, a clearance of heat transfer tubes may be increased by using the increasing unit. In this state, since a vibration suppression member may be inserted into the clearance of the heat transfer tubes, the vibration suppression member may be appropriately inserted.

According to the embodiments, the jig main body before the fluid flows in may be easily inserted into the clearance of the heat transfer tubes. Further, the fluid flows into the jig main body to significantly increase the clearance of the heat transfer tubes.

According to the embodiments, since the fluid flows into the jig main body to expand the jig main body, the clearance of the heat transfer tubes may be increased. As a result, since the jig main body may serve as even the increasing unit, the structure of the jig main body may be simplified.

According to the embodiments, even when an insertion path of the jig main body formed by the clearance of the heat transfer tubes is bent, the jig main body is provided along the insertion path by a guide member to be appropriately inserted into the insertion path.

According to the embodiments, by performing simple processing of a pipe body, the jig main body may be easily manufactured.

According to the embodiments, a front end member and a rear end member are attached to both axial sides of a cylinder body to configure the jig main body. As a result, since the fluid flows into the cylinder body to expand the cylinder body, the clearance of the heat transfer tubes may be increased.

According to the embodiments, since rigidity of a square cylinder body at a non-contact portion may be increased, the square cylinder body may be difficult to bend along the non-contact portion. As a result, the square cylinder body may be inserted directly into the clearance of the heat transfer tubes.

According to the embodiments, since the thickness of the square cylinder body at a contact portion may be decreased, the contact portion side of the square cylinder body may be easily expanded. Further, since the thickness of the square cylinder body at a non-contact portion may be increased, the rigidity of the non-contact portion side of the square cylinder body may be simply increased. As a result, the square cylinder body may be inserted directly into the clearance of the heat transfer tubes in that the square cylinder body is difficult to bend along the non-contact portion.

According to the embodiments, since the rigidity of the square cylinder body at the non-contact portion may be further increased by a welding portion, the square cylinder body may be more difficult to bend along the non-contact portion.

According to the embodiments, an inner surface of an angled portion is formed as a curved surface, and as a result, stress which is concentrated on the inner surface of the angled portion by the fluid that flows into the square cylinder body may be reduced. Therefore, deformation of the square cylinder body by the stress may be suppressed and tolerance of the jig main body may be improved.

According to the embodiments, the front end member may be easily inserted into the clearance of the heat transfer tubes.

According to the embodiments, since the rear end member may be restricted by the heat transfer tubes, the jig main body may be suppressed from dropping to the clearance of the heat transfer tubes.

According to the embodiments, a first path may be provided to increase in a direction perpendicular to a longitudinal direction. As a result, the rear end member may increase in a direction perpendicular to a longitudinal direction of the jig main body. Therefore, the rear end member may be difficult to drop to clearance of the heat transfer tubes.

According to the embodiments, since a fourth path may be a path shorter than the first path, the rear end member may be simply configured.

According to the embodiments, the jig main body may be manipulated by using a manipulation member. As a result, for example, even when the plurality of heat transfer tubes is submerged in water, the jig main body may be manipulated by using the manipulation member to allow the jig main body to be submerged in water and to be inserted into the clearance of the heat transfer tubes.

According to the embodiments, the clearance of the heat transfer tubes is increased by using the clearance increasing jig and the vibration suppression member may be inserted into the increased clearance of the heat transfer tubes. As a result, the vibration suppression member may be appropriately inserted.

What is claimed is:

1. A clearance increasing jig of a heat transfer tube, comprising:
    a jig main body inserted into a clearance between adjacent heat transfer tubes;
    an inflow hole provided in the jig main body and configured to allow a fluid to flow into the jig main body; and
    an increasing unit provided in the jig main body and configured to increase the clearance as the fluid flows into the jig main body,
    wherein the jig main body includes,
    a cylinder body having apertures at both longitudinal sides,
    a front end member which becomes a front end at an insertion side into the clearance while encapsulating one aperture of the cylinder body, and
    a rear end member with the inflow hole while encapsulating the other aperture of the cylinder body,
    wherein the cylinder body is a square cylinder body including four sides,
    the four sides include a pair of contact portions facing each other, which contact the heat transfer tubes, and a pair of non-contact portions facing each other, which do not contact the heat transfer tubes, and
    rigidity of the square cylinder body at each non-contact portion is larger than that of the square cylinder body at each contact portion,
    wherein the thickness of the square cylinder body at each non-contact portion is larger than that of the square cylinder body at each contact portion, and
    wherein the square cylinder body includes,
    a pair of concave-shaped members having a concave-shaped cross section, and
    a pair of welding portions provided by welding a groove formed by butting both ends of the pair of concave-shaped members, and
    the pair of welding portions are provided at the pair of non-contact portions and configured by rib portions that reinforce the pair of non-contact portions.

2. The clearance increasing jig according to claim 1, wherein the increasing unit is smaller than the clearance before the fluid flows in and is increased to be larger than the clearance after the fluid flows in.

3. The clearance increasing jig according to claim 1, wherein the jig main body is expandable as the fluid flows into the jig main body, and serves as even the increasing unit.

4. The clearance increasing jig according to claim 1, wherein in the square cylinder body, an inner surface of an angled portion is formed as a curved surface.

5. The clearance increasing jig according to claim 1, wherein the front end member is formed in a tapered shape in which the end is tapered toward the front end side in at least one of the direction where the heat transfer tubes face each other and the axial direction of the heat transfer tube.

6. The clearance increasing jig according to claim 1, wherein the rear end member is larger than the clearance.

7. The clearance increasing jig according to claim 1, wherein the rear end member includes the inflow hole, the outflow hole configured to allow the fluid to flow out, and a path configured to connect the inflow hole, the outflow hole, and the inside of the square cylinder body, the path includes a first path configured to connect the inflow hole and the outflow hole, and a second path which is branched from the first path to reach the inside of the square cylinder body, and the second path extends in the longitudinal direction and is perpendicular to the first path.

8. The clearance increasing jig according to claim 1, wherein the rear end member includes the inflow hole, the outflow hole configured to allow the fluid to flow out, and a path configured to connect the inflow hole, the outflow hole, and the inside of the square cylinder body, the path includes a third path configured to connect the inflow hole and the inside of the square cylinder body and a fourth path that is branched from the third path to reach the outflow hole, and the third path extends in the longitudinal direction and is perpendicular to the fourth path.

9. The clearance increasing jig according to claim 1, further comprising:

a manipulation member configured to manipulate the jig main body.

10. An additional installation method of a vibration suppression member that additionally installs the vibration suppression member at a clearance of adjacent heat transfer tubes by using the clearance increasing jig, the clearance increasing jig comprising:

a jig main body inserted into a clearance between adjacent heat transfer tubes;

an inflow hole provided in the jig main body and configured to allow a fluid to flow into the jig main body; and an increasing unit provided in the jig main body and configured to increase the clearance as the fluid flows into the jig main body, wherein the jig main body includes, a cylinder body having apertures at both longitudinal sides, a front end member which becomes a front end at an insertion side into the clearance while encapsulating one aperture of the cylinder body, and a rear end member with the inflow hole while encapsulating the other aperture of the cylinder body, wherein the cylinder body is a square cylinder body including four sides, the four sides include a pair of contact portions facing each other, which contact the heat transfer tubes, and a pair of non-contact portions facing each other, which do not contact the heat transfer tubes, and rigidity of the square cylinder body at each non-contact portion is larger than that of the square cylinder body at each contact portion, wherein the thickness of the square cylinder body at each non-contact portion is larger than that of the square cylinder body at each contact portion, and wherein the square cylinder body includes, a pair of concave-shaped members having a concave-shaped cross section, and a pair of welding portions provided by welding a groove formed by butting both ends of the pair of concave-shaped members, and the pair of welding portions are provided at the pair of non-contact portions and configured by rib portions that reinforce the pair of non-contact portions the method comprising:

inserting the clearance increasing jig into the clearance of the adjacent heat transfer tubes;

supplying a fluid into the clearance increasing jig via the inflow hole and bringing the pair of contact portions into contact with the adjacent heat transfer tubes so as to increase the clearance;

inserting the vibration suppression member into the increased clearance;

cancelling the increasing of the clearance by using the clearance increasing jig; and drawing the clearance increasing jig from the clearance.

* * * * *